United States Patent Office 3,494,292
Patented Feb. 10, 1970

3,494,292
CENTRIFUGAL PUMPS
Gordon Richard Walker, Southam, near Leamington Spa, and William Murray, Leamington Spa, England, assignors to Filton Limited, Leamington Spa, England
Filed Nov. 14, 1967, Ser. No. 682,963
Claims priority, application Great Britain, Nov. 17, 1966, 51,614/66
Int. Cl. F04c 29/02, 29/22
U.S. Cl. 103—114    6 Claims

ABSTRACT OF THE DISCLOSURE

A centrifugal pump, the impeller and a rigid casing for the working chamber therefor being formed of an internally reinforced plastics material, the material forming the impeller being bonded to a rigid metal component which is sealed from the fluid in the pump and couples the impeller and its shaft externally of the said chamber. The invention particularly concerns a pump with a rotary contact seal and a hydrodynamic seal produced by the fluid during rotation of the impeller at sufficient speed, and operative to break contact at the contact seal by the movement by differential fluid pressure acting on a displaceable wall of the hydrodynamic seal and carrying one member of such contact seal, that wall and a radially inwardly extending wall of the casing forming another wall of the hydrodynamic seal being moulded to form internally reinforced plastic structures about metallic members which serve for making positive couplings or connections outside the fluid zone of the pump.

---

Figure 1:
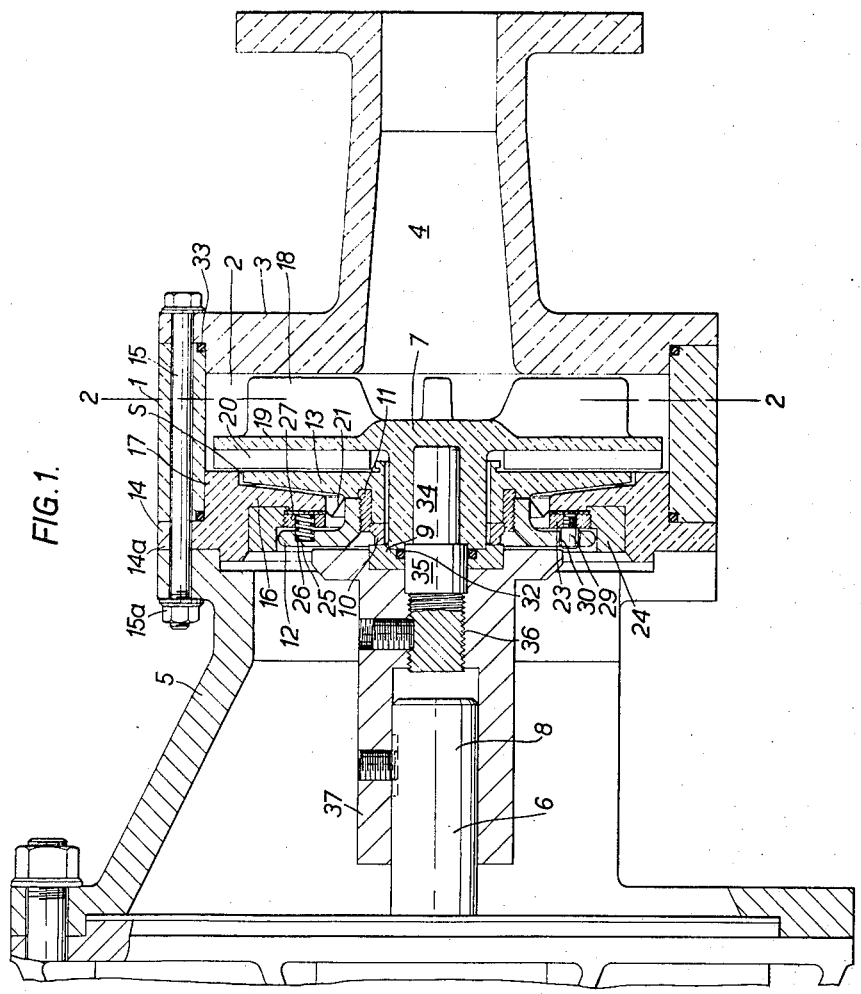

The present invention relates to centrifugal pumps in which an impeller rotates in a working chamber, and particularly although not exclusively, to such pumps intended for pumping acids or other corrosive fluids.

For pumping such fluids it is desirable that at least portions of the pump contacting the fluid to be pumped, be formed of a material which is corrosion-resistant.

It has been proposed in United Kingdom Patent No. 719,311 to make a centrifugal pump with a casing of thermo-plastic material and a rotor (impeller) and its shaft of metal provided with a coating of rubber or plastics material.

It has furthermore been proposed in United Kingdom Patent No. 903,904 to make the casing basically of a rigid material such as cast iron and to provide appropriate linear members of plastics or other corrosion-resistant material cemented to the rigid parts of the casing and to bond the impeller of corrosion-resistant material to an insert of such material for connection to the driving shaft.

According to the present invention, the working chamber is formed by a rigid casing of internally reinforced plastics material and the impeller is a rigid member of internally reinforced plastics material moulded and thus integrally bonded to a rigid metal component such as of steel which is sealed from the fluid in the pump and whereby the impeller is coupled or connected to its driving shaft.

The casing thus takes its rigidity and mechanical strength from the nature of the reinforced plastics material and is of a strong self-supporting character. The impeller likewise is of a strong self-sustaining character because of the nature of the reinforced plastics material and as the coupling or connecting component is sealed from the fluid in the pump it can be produced from a wrought metal. It may be of steel or steel alloy and particularly stainless steel, chosen to make a secure connection such as a durable screw connection, with the driving shaft of the impeller.

The said component may be a shaft-like member and the plastics material moulded to a portion thereof so as to leave exposed a screw-threaded part of said member and preferably a projecting part, which is screwed to the impeller driving shaft.

The invention is particularly although not exclusively suitable for embodiment in a centrifugal pump as described in Patent No. 2,873,986 or Patent 3,068,801 (hereinafter and in the claims termed a centrifugal pump of the kind described) in which the impeller shaft is sealed by a rotary sliding contact seal comprising one member which is carried by an axially displaceable wall which forms a wall of an annular chamber which is sealed save for an opening or openings communicating with the impeller chamber so that when the impeller is rotated at a sufficient speed the liquid is centrifuged away from the shaft on the impeller side of the said wall and a liquid ring covering the said opening is formed while the annular chamber is maintained filled and a pressure differential is set up on the opposite sides of the said axially displaceable wall which displaces the wall axially, and lessens or eliminates the pressure contact between the members of the contact seal.

In accordance with the present invention in such a pump the displaceable wall may be of a plastics material, and preferably an internally reinforced plastics material, moulded to a screw-threaded ring component which is of a metal as aforesaid and screwed to a metal ring plate which is spring-loaded for maintaining contact at the contact seal. The casing may comprise a ring-portion moulded to a ring of a metal as aforesaid to which a further ring is screwed which clamps a diaphragm which forms a seal between the displaceable wall and the said ring-portion. Thus strong and durable connections can be ensured between the displaceable wall and the said ring portion of the casing on the one hand and parts externally of the fluid-containing section of the pump on the other.

The reinforced plastics material aforesaid may advantageously be a resin-bonded fibrous glass material and preferably the resin is a thermosetting polyester or other thermo-setting resin. The metal component aforesaid of the impeller is preferably of stainless steel, as may be the metal component bonded to the displaceable wall and the metal components bonded to the ring-portion of the casing.

The aforesaid diaphragm, locally exposed to the pumped fluid, may be of polytetrafluoroethylene which provides the necessary flexibility and is highly corrosion-resistant.

The metal components aforesaid bonded to the impeller, the displaceable wall and the said ring portion of the casing may have a knurled or other suitable keying surface for promoting secure fixation of the said components to the moulded material.

Figure 2:
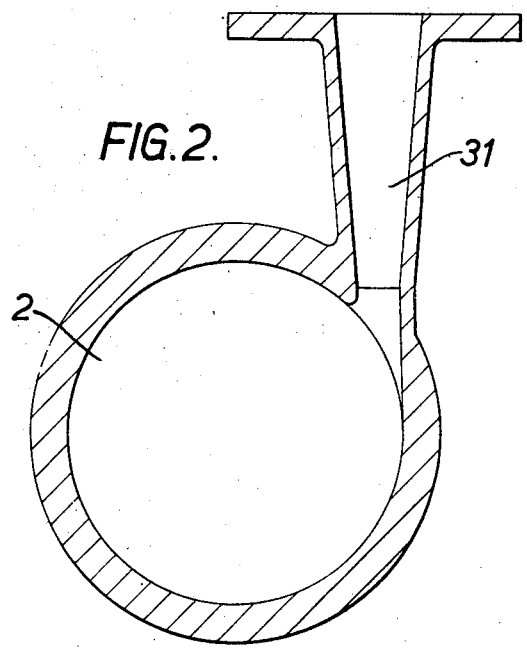
Figure 3:
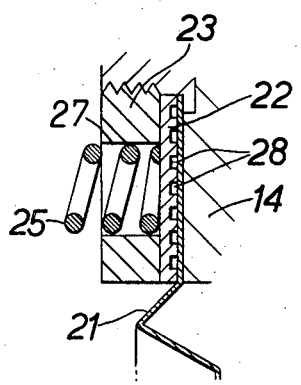

One embodiment of a pump according to the invention by way of example is illustrated in the accompanying drawings in which:

FIG. 1 is a sectional elevation,

FIG. 2 an end sectional elevation on a reduced scale on the line 2—2 of FIG. 1, and FIG. 3 is an enlarged section of a local part of FIG. 1.

Referring to the drawings, 1 indicates a cylindrical section of the pump casing. This section forms the peripheral wall of the working chamber 2 of the pump. The said section is secured between an end plate 3 providing the axial inlet 4 to the working chamber and a casing extension 5 to the outer end of which an electric driving motor (or any other suitable driving member) may be connected for driving the impeller 7, the shaft 8 of which fixedly carries one member 9 (e.g., of a ceramic material) of a rotary sliding contact seal, the co-operating member 10 of the said seal being carried by a non-rotatable ring 11 screwed into a ring plate 12 and forming an integral part of an axially displaceable wall 13 produced as is hereinafter described. The member 10 may be of glass-powder or glass-fibre reinforced polytetrafluoroethylene (P.T.F.E.).

The casing includes a ring part 14 in the form of a centrally apertured disc having a radial flange 14a which is clamped in position as a fixed part of the casing between the casing section 1 and the extension 5 by separate bolts 15 and nuts 15a which also secure the end plate 3 of the casing.

The ring-part 14 has a radially inward section 16 which with the axially enlarged portion 17 and the displaceable wall 13 forms an annular chamber S communicating at its outer periphery with the working chamber.

A spigot portion 34 of a metallic stainless steel stub-shaft component 35 which is screw-threaded at 36 forms an integral part of the impeller as will be later described.

The impeller comprises working blades 18 on one side of a disc portion 19, these blades not extending to the periphery of the disc portion, and seal blades 20 on the other side of the disc portion which extend outwardly radially beyond the outer periphery of the working blades, and in the form illustrated to the outer periphery of the disc portion. The axially outer edges (viz., those remote from the disc portion) of the seal blades rotate in near relation to the adjacent surface of the displaceable wall 13 and to the adjacent radial surface of the enlarged portion 17 of the casing ring-part 14. The annular chamber is sealed off by a diaphragm 21 which is clamped between a shouldered surface of the inward section 16 of casing part 14 and a backing ring or washer 22 (FIG. 3) pressed against the diaphragm by a clamping ring 23 which is screwed to a ring 24 which is made integral with the casing part 14 as will be hereinafter described. The radially inner margin of the diaphragm is clamped between the displaceable wall and the ring plate 12. A number of springs 25 are accommodated at one end in sockets 26 in the ring plate 12 and pass through openings 27 in the clamping ring 23, and at the other end bear against the backing ring or washer 22. The latter is provided with concentric annular grooves 28 in the face which bears against the diaphragm so that the area of contact between the backing ring and the diaphragm is reduced, and the clamping pressure applied to the ring can be reduced.

The ring-plate 12 is held against rotation relatively to the clamping ring 23 (and the casing) by torque pins 29 screwed to the clamping ring and so fitting in holes 30 in the ring-plate that the latter can slide axially thereon. The discharge from the working chamber is by way of a tangential diffuser 31 (FIG. 2). An O-ring 32 is provided between the seal ring 9 and the shaft and a further O-ring 33 is provided at each end of the casing part 14.

The action of the pump is as follows:

The working chamber 2 comprises an annular chamber S which will initially be filled with liquid, entered by way of the axial inlet and sealed by the contact seal 9, 10 and diaphragm 21. The impeller 7 is rotated at high speed and liquid continuously entering the inlet passes through the working chamber and is discharged through the tangential diffuser 31 which converts the kinetic energy to pressure energy. The seal blades 20 centrifuge the liquid on their side of the impeller disc so that the annular chamber S will remain filled whilst on the other side of the displaceable wall and between this and the impeller disc the liquid will be formed into an outer ring so that the working chamber is sealed off from the shaft by a liquid seal during running of the pump and the contact seal, which is operative between the members 9 and 10 during the stationary period or slow speed running of the impeller, will be eliminated, or the pressure relieved, by differential liquid pressure on opposite sides of the displaceable wall resulting in the said wall and connected parts including the contact seal ring 10 moving somewhat axially towards the seal blades 20, sufficient clearance being provided for this purpose.

The contact seal is initially ensured by the action of the springs 25, and the ring plate with seal ring 10 is held against rotation by the torque pin or pins 29.

A pump having the principal features above described has been described and claimed in the aforesaid Patent No. 3,068,801.

We have found that when a pump such as the foregoing is to be used for pumping corrosive fluids, damage to the sensitive parts of the pump may quickly occur and undesirably influence its efficiency.

To this end according to the present invention, at least parts forming the impeller chamber and the annular chamber are formed to provide corrosion-resistant surfaces and are preferably made of a resin-bonded fibrous glass material.

Now insofar as concerns the cylindrical section 1 and the end plate 3, these can be economically produced by simply moulding such a material, but insofar as concerns the impeller itself, the displaceable wall 13 and the casing ring-part 14 they have to be adapted for coupling to metal parts of the pump as by screwing. They are accordingly moulded of the resin-bonded fibrous glass material about metal coupling or connecting parts which are preferably of stainless steel. The metal connecting or coupling is in each case used as an insert into the mould and about which the plastics material is moulded to shape.

In the case of the impeller this is moulded of the resin-bonded fibrous glass material about the spigot portion 34 of the stainless steel shaft 35 which is screw-threaded at 36 for connection to a stainless steel sleeve 37 which receives the spigot portion of the shaft 6 of the motor. The reference numeral 8 has been applied to the rotating shaft parts collectively, i.e., to the stub-shaft 35, thus coupling sleeve 37 and the driving shaft 6.

In the case of the ring-part 14 of the casing this is primarily of the plastics material moulded around and firmly bonded to the internally screw-threaded metal ring 24 so that the screw of the latter is exposed for screwing to the clamping ring 23. The displaceable wall 13 is primarily of the plastics material which has been moulded about the metal screw ring 11 which is screwed to the ring plate 12.

The annular chamber wall includes part of the diaphragm 21 and this may be made of polytetrafluoroethylene (P.T.F.E.) which is highly corrosion-resistant and has the necessarily flexibility for its purpose.

It is convenient to make the extension 5 also of moulded resin-bonded fibre-glass material.

The shaft-like component 35 and the screw rings 24 and 11 may be made of stainless steel as may be the ring plate and all the principal metal parts exposed to the atmosphere, which may be corrosive. The springs 25 may be plastic-coated.

The aforesaid parts which are to be bonded to the plastics material may be knurled, e.g., with a diamond pattern, or otherwise formed to key with the moulded plastics material.

The casing ring-part 14 with ring 24, the displaceable wall 13 with ring 11 and sealing ring 10 and the ring plate 12 form a unit in which the diaphragm is clamped and which can be readily removed e.g., to have access to the contact seal.

What is claimed is:

1. A centrifugal pump comprising an impeller, a driving shaft therefor, a rigid metal stub-shaft component, means coupling said stub-shaft component and said driving shaft to form composite shaft means, a rigid casing of internally reinforced plastics material forming a working chamber, said impeller being a rigid member of internally reinforced plastics material moulded and thus integrally bonded to the said rigid metal stub-shaft component, an axially displaceable wall in said chamber, said impeller being situated in said chamber on one side of said wall and an annular chamber being formed by said wall with the casing on the other side of said wall, a rotary sliding contact seal comprising one member which is carried by said axially displaceable wall and a second member carried by said composite shaft means, means permitting communication between the portions of the working chamber on opposite sides of the said wall so that when the impeller is rotated at a sufficient speed the liquid is centrifuged away from the shaft on the impeller side of said wall and a liquid ring covering the said means of communication is formed while the annular chamber is maintained filled and a pressure differential is set up on the opposite sides of the said wall which displaces the wall axially and lessens or eliminates the pressure contact between the members of the contact seal, a screw-threaded metal ring component, said axially displaceable wall having been moulded of plastics material and firmly bonded to a portion of said metal ring component, a ring plate, said metal ring component being screwed to the said ring-plate and means spring loading said ring plate to maintain contact at the contact seal until the said wall is displaced by the said pressure differential; a further ring component, said casing comprising a ring-portion moulded to said further ring component, a diaphragm, and a diaphragm-clamping ring screwed to said further ring component for clamping said diaphragm and forming a seal between the displaceable wall and the said ring-portion of the casing.

2. A centrifugal pump according to claim 1, in which the said casing including said ring portion thereof, said impeller and said axially displaceable wall are each of a resin-bonded fibrous glass material.

3. A centrifugal pump according to claim 1 in which said stub shaft component and said ring components each have an external keying surface to which the plastics material is moulded.

4. A centrifugal pump comprising an cylindrical casing with an axial inlet duct at one side, an impleller rotatably mounted in said casing, said casing and said impeller being moulded of a self-supporting internally reinforced plastic material, said impeller being provided with a solid metal stub-shaft having a cylindrical end portion and comprising a hub portion moulded around said cylindrical end portion and integrally bonded thereto, said cylindrical end having a keying surface so as to ensure a rigid connection between said shaft and said impeller hub portion, a sleve-like coupling member into one end of which projects the other end of said stub-shaft extending towards the other side of the casing, a driving shaft fitted into the other end of said coupling member, the coupling member coupling the stub-shaft and the said driving shaft.

5. A centrifugal pump comprising a casing, an axial inlet duct, an impeller rotatably mounted in said casing, said casing and said impeller being moulded on a self-supporting internally reinforced plastic material, said impeller being provided with a metal stub-shaft component and comprising a hub portion moulded around one end portion of said stub-shaft component and thus integrally bonded thereto so as to leave exposed a screw-threaded part of said stub-shaft component, a driving shaft, and means coupling said stub-shaft component and said driving shaft axially beyond the said hub, said means comprising a sleeve-like member screwed at one end to said part and at the other end fitting over the corresponding end of said driving shaft.

6. A centrifugal pump comprising a casing, an axial inlet duct, and impeller rotatably mounted in said casing, said casing and said impeller being moulded of a self-supporting internally reinforced plastic material, said impeller being provided with a metal stub-shaft and comprising a hub portion moulded around one end portion of said stub-shaft and thus integrally bonded thereto, a driving shaft, and means coupling said stub shaft and said driving shaft axially beyond said hub, said impeller having an integrally moulded hub, said metal stub-shaft component having the said impeller hub moulded about said one end portion thereof so as to leave exposed a screw-threaded part of said stub-shaft component, a sleeve-like member screwed at one end to said part and at the other end fitting over the coresponding end of said driving shaft.

References Cited

UNITED STATES PATENTS

| 1,912,408 | 6/1933 | Schelhammer | 103—114 |
| 1,925,898 | 9/1933 | Fritz | 103—114 |
| 2,283,263 | 5/1942 | Kates | 103—114 |
| 2,873,986 | 2/1959 | Murray. | |
| 3,094,075 | 6/1963 | Logue | 103—114 |
| 3,395,645 | 8/1968 | Vilet. | |
| 3,146,722 | 9/1964 | Warman | 103—114 |

FOREIGN PATENTS

| 636,842 | 3/1962 | Italy. |
| 394,495 | 6/1933 | Great Britain. |

HENRY F. RADUAZO, Primary Examiner

U.S. Cl. X.R.

103—111; 277—32; 287—52